July 4, 1961 W. A. FESSLER ET AL 2,991,193
TRANSPARENT HEAT-SEALABLE SHEETS CARRYING VOLATILE ANTIOXIDANT
AND FOOD PACKAGE MADE THEREFROM
Filed Feb. 6, 1957
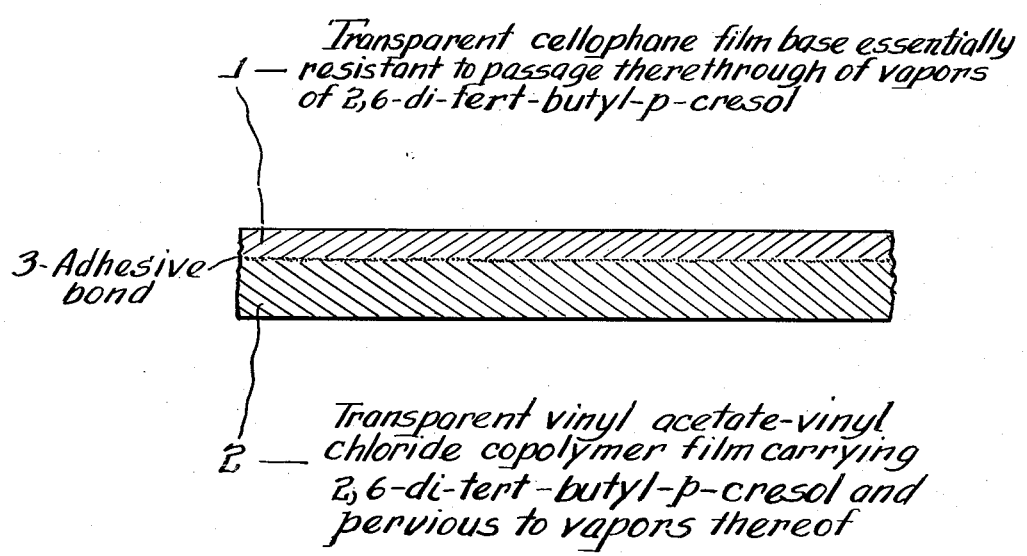
INVENTORS
William Alfred Fessler
Clemens A. Hutter
John G. Schafer
George O. Stricker
By: Wallenstein Spangenberg attys

United States Patent Office 2,991,193
Patented July 4, 1961

2,991,193
TRANSPARENT HEAT-SEALABLE SHEETS CARRYING VOLATILE ANTIOXIDANT AND FOOD PACKAGE MADE THEREFROM
William Alfred Fessler, Glen Ellyn, Clemens A. Hutter, Elmhurst, John G. Schafer, La Grange Park, and George O. Stricker, Blue Island, Ill., assignors to Daubert Chemical Company, Chicago, Ill., a corporation of Illinois
Filed Feb. 6, 1957, Ser. No. 638,425
4 Claims. (Cl. 117—68)

This invention relates to the protection against oxidation of various materials in transparent wrappers, including foodstuffs such as meats, potato chips, chocolate, coffee, cheeses, eggs, yeast, crackers, nuts such as peanuts, pecans, cashews, etc., as well as a wide variety of other commodities, and is especially concerned with the production of new and highly useful transparent heat-sealable sheets and packages carrying or embodying therein volatile antioxidant protectants the vapors of which are gradually released, in use, to effect protection against oxidation of the foods or other articles which are wrapped or otherwise enclosed or packaged in said sheets.

It has heretofore been well known to produce sheet stock material containing volatile protectants. Thus, for example, it has been suggested to impregnate solid sheet packaging or wrapping materials such as paper, cloths, textile materials, metal foils and transparent films or sheets with volatile protectants and to use the resulting impregnated sheets for the wrapping or packaging of foodstuffs of various types, typical of such disclosures appearing in U.S. Patents Nos. 2,051,170; 2,071,625; 2,159,743; 2,265,522; British Patents Nos. 474,666 and 555,907; and Australian Patent No. 103,902. The volatile protectant vapors are gradually released from the wrapping material and serve to protect the article or articles which are wrapped or packaged therein against mold, bacteria and the like.

Although, as indicated by the above-mentioned patents, numerous proposals have been made to prepare and utilize wrapping materials embodying a volatile protectant therein, so far as we are aware no wrapping materials containing a volatile antioxidant have come into any significant commercial use. Those which have been suggested have possessed, generally speaking, a number of important disadvantages such as rapid dissipation of the antioxidant, adverse properties with respect to transparency, as well as still others.

It has been found, in accordance with the present invention, that certain transparent heat-sealable sheets may be prepared carrying or impregnated with a certain volatile anti-oxidant which have outstandingly satisfactory properties and characteristics. Said sheets have excellent transparency so that articles wrapped therein are clearly visible to the naked eye whereby their condition can readily be ascertained merely by visual examination through the sheet wrapping. Furthermore, since, as stated, said sheets are heat-sealable, packages made therefrom using said sheets as wrapping are readily sealed, through usual heat procedures, electronically or otherwise.

In addition to the important qualities of excellent transparency and heat-sealability which the sheets of the present invention must possess, there is a number of other significant properties which said sheets, in order to be satisfactory for use under a wide variety of conditions, must have. The sheets must be tough so as to withstand tearing, puncturing or rupture under adverse or rough conditions of use or shipment and handling of articles wrapped therein. They must also possess good flexibility so that they may easily and readily be wrapped around objects of various, odd and conglomerate shapes in order, in general, reasonably to conform to the configuration of the article which is to be wrapped therein. Another important characteristic of such sheets is that they must release the vapor from the volatile antioxidant protectant gradually but at a sufficient rate so that protection will be effective and yet, at the same time, the release of the antioxidant vapors must not be at so rapid a rate as to result in dissipating too quickly the vapors from the volatile antioxidant protectant. In this connection, it will be understood, of course, that, in general, the wrappers should retain their properties of protecting certain articles packaged or wrapped therein against oxidation for substantial periods of time, particularly of the order of at least several weeks. Still another important property which the sheets must possess is compatibility with the volatile antioxidant protectant which is impregnated thereinto, and with the antioxidant protectant vapors which are released, so that, for instance, no adverse effect is had on the integrity of the sheets, and so, by way of further instance, reactions are not set up which produce vapors or materials which have an adverse effect on the articles within the package, or which interfere with the desired antioxidant protective action on said articles.

In accordance with the present invention, the novel transparent heat-sealable sheets comprise a transparent cellophane film base, which is essentially resistant to the passage therethrough of vapors of the volatile antioxidant protectant; a transparent vinyl acetate-vinyl chloride copolymer covering film which is bonded to the transparent cellophane base and which is pervious to the passage therethrough of said vapors; 2,6-di-tert-butyl-p-cresol as the volatile antioxidant protectant which it has been found is compatible with and embodied in said vinyl acetate-vinyl chloride copolymer covering films; and advantageously a plasticizer.

The transparent cellophane film base is, in general, selected so as to provide at least most of the mechanical strength of the transparent finished sheet. It has been found to be essentially resistant, impenetrable or impermeable to the passage therethrough of the protective vapors of the antioxidant 2,6-di-tert-butyl-p-cresol so that the vapors thereof are not dissipated into the atmosphere but pass from the aforesaid cover film into the interior of the package or wrapped body so as to create an atmosphere of protective antioxidant vapors within the package containing the particular article involved. It will be understood, of course, that the body which is to be wrapped is so wrapped that the cover film faces inwardly toward or adjacent said body. While the cellophane utilized as the film base may be ordinary uncoated cellophane, it has been found to be particularly advantageous to utilize transparent cellophane having a moisture-resistant heat-sealable coating on one side, such as nitrocellulose or the like, in which case the opposite side is bonded to the cover film.

The transparent film-forming vinyl acetate-vinyl chloride copolymers have been found to be outstandingly satisfactory for use in the production of the transparent heat-sealable wrappers of the present invention because of their clarity, their heat-sealing characteristics, their strong adhesion to cellophane, their absence of tack in laid down in film form, their economy, their lack of adverse effect on the edibility of foods with which they may come into contact, and their particular compatibility with the 2,6-di-tert-butyl-p-cresol.

As indicated above, the inclusion of a plasticizer in the vinyl acetate-vinyl chloride copolymer film is desirable although not essential. While any one or more of various available plasticizers can be used as, for instance, butyl stearate, dibutyl sebacate, di-2-ethylhexyl phthalate, and di-iso-octyl phthalate, we find it particularly desirable to use acetyl tri-butyl citrate. The quantity of plasticizer, where utilized, is variable, but ordinarily should not exceed about 25% by weight of the solvent-free vinyl acetate-vinyl chloride copolymer film.

In the drawing, there is shown, in greatly enlarged form, a sectional view taken through a transparent heat-sealable sheet made in accordance with our invention, in which numeral 1 represents the transparent cellophane film base essentially resistant to the passage therethrough of the vapors of 2,6-di-tert-butyl-p-cresol, 2 represents the transparent vinyl acetate-vinyl chloride copolymer film carrying the 2,6-di-tert-butyl-p-cresol, and 3 represents the adhesive bond between the films 1 and 2.

The transparent heat-sealable sheets of the present invention can be made in a variety of ways. One mode of procedure is, for example, to lay down, for instance by roller coating or brushing, on the transparent cellophane film base, in sheet form, an emulsion of the transparent vinyl acetate-vinyl chloride copolymer covering film-forming material to which has been added and advantageously dissolved therein, although it may also simply be suspended or dispersed therein, the 2,6-di-tert-butyl-p-cresol. The above or other conventional coating techniques can be used to lay down a uniform, even film of desired thickness after which the sheets then may be dried, for example, in a suitable oven at appropriate temperatures, generally of the order of 140 degrees F. In commercial operations, the coating and drying and roll winding operations can be conducted in a continuous manner using conventional continuous equipment.

Another way in which the transparent sheets of the present invention can be made is by dissolving the vinyl acetate-vinyl chloride copolymer, preferably also containing the selected plasticizer, in a suitable volatile organic solvent, admixing with the said solvent solution the 2,6-di-tert-butyl-p-cresol in the requisite proportions, then laying down a coating thereof on the uncoated side of the transparent cellophane film base in accordance with conventional coating techniques, and evaporating off the organic solvent.

Still another way of preparing the transparent sheets of the present invention comprises first producing the transparent heat-sealable sheet by bonding or laminating together the transparent cellophane film base and the transparent vinyl acetate-vinyl chloride copolymer covering film, in sheet form, either in a continuous or discontinuous manner, the bonding being effected in any suitable way as, for instance, by heat sealing or electronic heat sealing techniques or through the use of softening or tackifying organic solvents. The resulting transparent duplex sheet may then be treated to impregnate the transparent covering film with the 2,6-di-tert-butyl-p-cresol through contacting said covering film with a solution or emulsion or dispersion of the aforesaid antioxidant for a period of time to effect the desired degree of impregnation, after which the sheet may be dried.

The especially preferred procedure consists in passing a sheet of a commercial transparent cellophane, one side of which has previously been coated with a moisture-proof heat-sealing layer (typical examples of such cellophanes are those sold under the trade identification "300 MSAD–80" and "450 MSAD–80") over a smooth metal applicator roll which is partially submerged in an organic solvent solution of the vinyl acetate-vinyl chloride copolymer contained in a trough. A typical and very satisfactory solution comprises 70 parts acetone, 24 parts vinyl acetate-vinyl chloride copolymer (e.g. the product sold under the trade identification "Vinylite VMCH"), 4.5 parts acetyl tributyl citrate (e.g. the plasticizer product sold under the trade identification "Citroflex A–4"), and 1.5 parts 2,6-di-tert-butyl-p-cresol, said parts being by weight. A coating of said solution is thus deposited on the uncoated side of the cellophane. Immediately thereafter the thus coated cellophane is passed over a bar wound with wire to remove excess coating solution which falls back into the feed trough. The coated cellophane sheet stock then passes through an oven where acetone is removed by a counterflow current of air heated to about 160 degrees F. Residence time in the oven may be about 30 seconds, although it will be understood that the time and temperature are variable. Upon emerging from the drying oven, the coated cellophane may be allowed to remain in the air at room temperature for a few seconds, for instance 5 to 10 seconds, thereby being cooled sufficiently so that blocking does not occur when the coated cellophane sheet stock is wound or rewound on a roll. The coating operation is advantageously conducted in a continuous manner in accordance with known coating techniques and coating apparatus.

The thickness of the transparent heat-sealable sheets of the present invention is, of course, variable. In all instances, however, they should not be so thick as to interfere with their flexibility and the ability to utilize the same for wrapping and packaging purposes. In general, the finished transparent sheet desirably has a thickness of about 0.4 to about 5 to 10 mils, particularly, from about 1 to 3 or about 1 to 5 mils. The transparent cellophane film base, for example, may have a thickness of the order of about 1 to 1.5 mils and the thickness of the transparent vinyl acetate-vinyl chloride copolymer covering film may, for instance, be of the order of 0.3 to 2 or 3 mils but is more desirably of a thickness of about 0.4 to 0.5 or 0.6 mil so that the total thickness may be, for instance, from 1.3 to 2 or 2.5 mils for the final finished transparent sheet.

The amount of 2,6-di-tert-butyl-p-cresol which is embodied in the transparent vinyl acetate-vinyl chloride copolymer cover film is somewhat variable, depending, among other things, upon the desired useful life of the sheet from the standpoint of its effectiveness to protect the particular article wrapped therein. Generally speaking, the 2,6-di-tert-butyl-p-cresol is embodied in the transparent cover film in an amount sufficient to constitute, by weight, from about 0.03 to about 1 or 2 grams per square foot of the area of the transparent sheet. Preferably, the amount of 2,6-di-tert-butyl-p-cresol incorporated into the transparent cover film will, in most cases, range from about 0.04 or about 0.05 gram to about 0.07 to 0.1 gram per square foot of area of the sheet. In terms of the amount, by weight, of the 2,6-di-tert-butyl-p-cresol based on the weight of the transparent cover film, good results are obtained, in at least most cases, with said volatile antioxidant protectant comprising from about 2 to about 12%, preferably 4 to 6%, by weight, of the cover film.

While the transparent heat-sealable sheets made pursuant to the present invention constitute duplex films, in the sense that they comprise bonded transparent layers one of which, the coated cellophane sheet, is essentially resistant to the passage therethrough of the volatile antioxidant protectant vapors of the 2,6-di-tert-butyl-p-cresol, and the other of which, the vinyl acetate-vinyl chloride copolymer, is pervious to the passage therethrough of said vapors, the volatile antioxidant being embodied in said latter layer, it will be understood that, in certain cases, it may be desirable to produce multiplex transparent sheets, that is, sheets containing at least three transparent films or layers. Thus, for example, if, in a given transparent duplex film made in accordance with the preferred teachings set forth above, the rate at which the vapors of the 2,6-di-tert-butyl-p-cresol are released into the package containing the article is greater than may be desired, the rate of such release or diffusion can be decreased, for instance, by coating the transparent cover film, which bears said volatile antioxidant protectant, with a transparent film or coating which retards such release or diffusion. Another procedure, in this same general connection, comprises laying down, on a surface of the transparent cellophane base film, a thin layer of a vinyl acetate-vinyl chloride copolymer transparent covering film composition, for instance an acetone solution thereof, in which the 2,6-di-tert-butyl-p-cresol has been incorporated, and then bonding thereto a transparent preformed film or sheet of transparent vinyl acetate-vinyl chloride copolymer. In this case, the composite sheet will comprise transparent sheets or films of cellophane and vinyl acetate-vinyl chloride copolymer bonded or laminated together, in sandwich form, with a transparent vinyl acetate-vinyl chloride copolymer which carries the 2,6-di-tert-butyl-p-cresol. In most cases, at least, resort need not be made to such latter procedures.

As stated previously, the transparent heat-sealable sheets of the present invention are desirably made in such a way that the effectiveness of the antioxidant protection afforded to articles packaged or wrapped therein will last for substantial periods of time, at least several weeks, under storage or transit conditions. Since packages made from the transparent sheets can be heat sealed, there will be little or no free flow of air through gross openings. Hence, any loss of volatile antioxidant protection from the system will be by diffusion through the transparent film material outwardly and this diffusion rate will, in general, be very low. By using a transparent cellophane film base one surface of which is coated with a moisture-proof heat sealing layer, the final transparent sheet, after being coated with the vinyl acetate-vinyl chloride copolymer containing the 2,6-di-tert-butyl-p-cresol as described above, is heat-sealable on both sides.

As illustrative of the highly advantageous results which are achieved through the utilization of transparent heat-sealable sheets made in accordance with our invention, reference is made to certain tests wherein bag type containers were made by folding sheets and heat sealing the two sides, the material under test, in this case nuts, as described below, then being placed in the bag and the third side sealed. In the case of the sheets made pursuant to the present invention (hereafter called "treated sheets"), the sheet was folded so that the vinyl acetate-vinyl chloride copolymer film bearing the 2,6-di-tert-butyl-p-cresol formed the inside surface of the bag. Similar sized bags were made from transparent cellophane sheets coated on one side with a moisture-proof coating, namely, commercial moisture-proof cellophane as referred to above (hereafter called "untreated sheets"). The sealed filled bags of both types were then placed in a circulated air cabinet maintained at 122 degrees F.±1 degree F. Sets of bags were opened at intervals and examined for odor and taste. The results of said tests are as follows:

*Pecans—cooked in oil and salted*

(1) Packed in bags from untreated sheets—rancid in 6 days
(2) Packed in bags from treated sheets—not rancid until 9 weeks

*Unblanched (red skin) peanuts—cooked in oil and salted*

(1) Packed in bags from untreated sheets—rancid in 16 days
(2) Packed in bags from treated sheets—not rancid until 9 weeks

What is claimed as new and desired to be protected by Letters Patent of the United States is:

1. A transparent heat-sealable sheet comprising a transparent cellophane film base, a transparent vinyl acetate-vinyl chloride copolymer covering film bonded to said film base, said covering film carrying 2,6-di-tert-butyl-p-cresol.

2. A transparent heat-sealable wrapping sheet for edible products comprising a transparent cellophane film base having a moisture-proof heat-sealable coating on only one surface thereof, a transparent vinyl acetate-vinyl chloride copolymer covering film bonded to said cellophane film base against the surface thereof which does not have said moisture-proof coating, said covering film carrying 2,6-di-tert-butyl-p-cresol.

3. A transparent heat-sealable sheet comprising a transparent cellophane film base having a moisture-proof heat-sealable coating on only one side thereof, a transparent vinyl acetate-vinyl chloride copolymer covering film bonded to said cellophane film base against the surface thereof which does not have said moisture-proof coating, said sheet having a thickness of about 1 to 3 mils, and 2,6-di-tert-butyl-p-cresol embodied in said covering film in an amount comprising from about 0.05 to about 0.1 gram per square foot of said sheet.

4. A transparent heat-sealable wrapping sheet for edible products comprising a transparent cellophane film base having a moisture-proof heat-sealable coating on only one side thereof, said coating also being essentially resistant to the passage therethrough of volatile antioxidant vapors of the volatile antioxidant hereafter defined, a transparent vinyl acetate-vinyl chloride copolymer covering film bonded to the non-coated surface of said cellophane film base, said sheet having a thickness of about 1 to 3 mils, and 2,6-di-tert-butyl-p-cresol embodied in said covering film.

References Cited in the file of this patent

UNITED STATES PATENTS

| | | |
|---|---|---|
| 2,075,106 | Fordyce et al. | Mar. 30, 1937 |
| 2,156,987 | Hill | May 2, 1939 |
| 2,233,141 | Musher | Feb. 25, 1941 |
| 2,391,620 | Quarles et al. | Dec. 25, 1945 |
| 2,676,897 | Trillich | Apr. 27, 1954 |
| 2,679,969 | Richter | June 1, 1954 |
| 2,758,032 | Pullman et al. | Aug. 7, 1956 |
| 2,843,497 | Stuckey et al. | July 15, 1958 |

OTHER REFERENCES

Modern Packaging, January 1948, pages 125–127.
Journal American Oil Chemists' Society, vol. 32, 1955, pages 386 and 387.